Feb. 13, 1968   W. G. BARNARD, JR   3,368,800
BLENDER
Filed April 13, 1965

INVENTOR.
WILLIAM G. BARNARD, JR.
BY
Ely, Golrick & Flynn
ATTORNEYS 3,368,800
BLENDER
William G. Barnard, Jr., Olmsted Falls, Ohio, assignor to
The Vita Mix Corporation, a corporation of Ohio
Filed Apr. 13, 1965, Ser. No. 447,655
3 Claims. (Cl. 259—108)

This invention relates to a food blender.

Food blenders commonly comprise a set of blades rotatably mounted at the bottom of a food container or bowl and driven by an electric motor at a speed effective to comminute or pulverize the food into finely divided particles. One disadvantage of such blenders prior to the present invention has been the tendency for certain types of food materials to "bridge" over the rotating blades, tending to retard the material from passing freely by gravity down into contact with the blades to be thoroughly and evenly comminuted in the manner desired.

One principal aspect of the present invention is concerned with overcoming this difficulty.

Another important aspect of this invention is directed to the provision of a blender having a novel blade construction which adapts it for chopping up relatively hard materials, such as ice cubes and whole grains, as well as for liquifying softer food materials.

Accordingly, it is an object of this invention to provide a novel and improved blender which may be operated to achieve a more thorough and uniform comminution of a wide variety of food materials by eliminating any tendency for the material to bridge over the blades of the blender.

Another object of this invention is to provide a novel and improved blender which is adapted to liquify soft materials and also to chop up relatively hard materials without damage to the blades.

Further objects and advantages of this invention will be apparent from the following detailed description of a presently-preferred embodiment, which is shown in the accompanying drawing.

Figure 1:
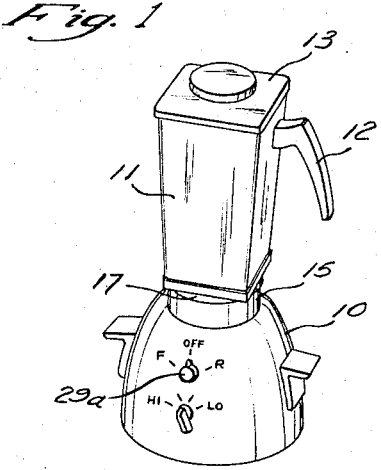
FIGURE 1 is a perspective view of the present blender.

Referring to FIG. 1, the blender shown therein comprises a hollow rigid base 10, enclosing an electric motor, and a removable food container or bowl 11 overlying the base. This container is provided with a handle 12 and a removable top cover 13.

Figure 2:
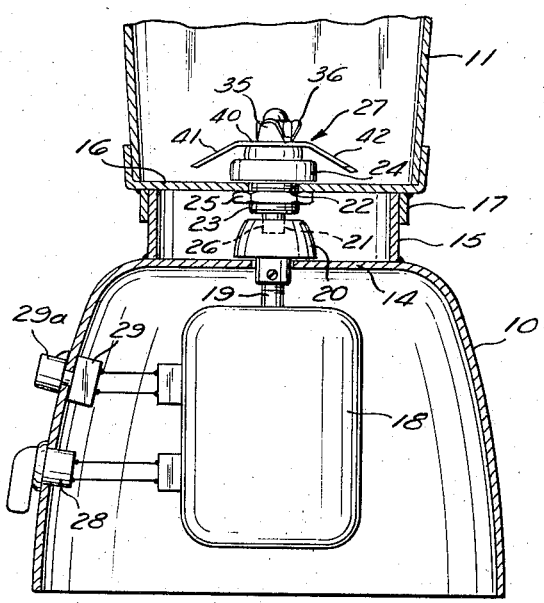
FIGURE 2 is an enlarged fragmentary vertical section of the lower half of the FIG. 1 blender.

As shown in FIG. 2, the base 10 has a flat top wall 14 and an integral, upstanding, annular neck 15 extending up from the top wall. The container 11 has a flat bottom wall 16 with a depending annular flange 17 that snugly encircles the upstanding neck 15 when the container is assembled to the base.

The electric motor 18 is rigidly mounted within the base below the latter's top wall 14 and presents an upwardly extending rotary drive shaft 19. A rubber coupling member 20 is rigidly connected to the upper end of this shaft and is disposed above the top wall 14 of the base, centrally located within the upstanding neck 15 on the base. This rubber coupling member presents an upwardly-facing socket or recess 21 of suitable polygonal cross-section.

The bottom wall 16 of the container has a central opening 22 which passes the depending screw-threaded shank 23 of a mounting member 24 which overlies the bottom wall at this opening. A nut 25 is threaded onto this shank to clamp this mounting member 24 tightly to the bottom wall of the container. This mounting member rotatably supports a blade drive shaft having a polygonal lower end 26, which is snugly, but detachably, received in the socket 21 in the motor driven rubber coupling member 20. This blade drive shaft extends up into the container 11 and is connected there to the blade assembly in any suitable fashion, the details of which are not part of the present invention.

The motor 18 is provided with a speed control switch 28 having an operating handle at the front of the base 10. This speed control switch controls the motor speed in a conventional manner.

In accordance with the present invention, the motor 18 is also controlled by a reversing switch 29 with a manual control knob 29a at the front of the base. In the particular embodiment illustrated, this reversing switch has three positions—"off," "forward" and "reverse." By appropriately positioning its control knob 29a, this reversing switch will cause the motor to rotate in one direction or the other through conventional electrical circuit connections whose details are not part of this invention.

Figure 3:
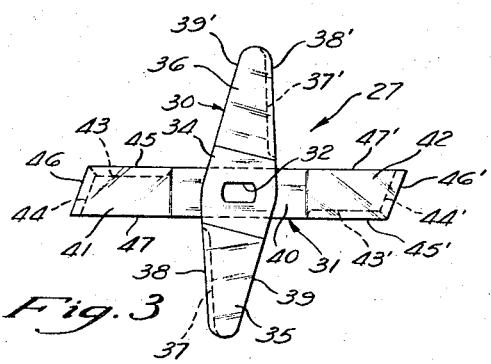
FIGURE 3 is a top plan view of the rotary blade assembly in this blender.
Figure 5:
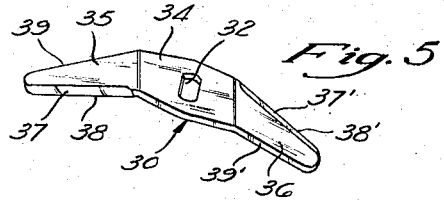
FIGURE 5 is a bottom perspective view of one of the blades in the blade assembly of FIGS. 3 and 4.
Figure 4:
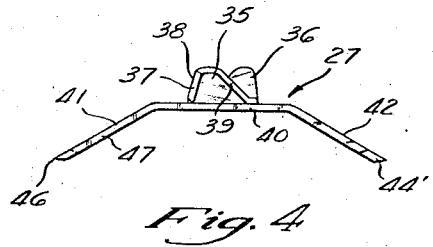
FIGURE 4 is a side elevational view of this blade assembly.
Figure 6:
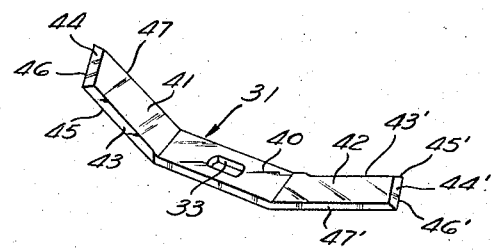
FIGURE 6 is a bottom perspective view of the other blade in this blade assembly.

The blade assembly 27 in the blender is generally cross-shaped in plan view (FIG. 3). It comprises a pair of blades 30 and 31 (FIG. 3) having aligned, centrally located, ablong openings 32 and 33 (FIGS. 5 and 6) for receiving the complementary shaped upper end of the blade drive shaft. As shown in FIG. 5, the first blade 30 has a flat horizontal central portion 34 and flat laterally extending arms 35 and 36 on opposite sides of this central portion. As shown in FIGS. 2 and 4, these two blade arms 35 and 36 are inclined upward and outward from the horizontal central portion 34 of this blade.

The blade arm 35 has one of its sides beveled to provide a surface 37 (FIGS. 3 and 5) along substantially the entire length of this arm which extends at an acute angle to the plane of each major top and bottom face of this blade arm. Preferably, this angle is about 45°. This beveled surface provides a sharp leading edge 38 at the top of this blade arm when the blade assembly rotates clockwise in FIG. 3. The opposite side face 39 (FIG. 3) of this blade arm extends substantially perpendicular to the plane of each major face of the blade arm, and therefore it provides a comparatively blunt edge at this side of the blade arm.

The other arm 36 of this blade presents similar side surfaces which have the same reference numerals as those for blade arm 35, but with a "prime" subscript added.

With this blade construction when the blade assembly rotates clockwise in FIG. 3, the sharp beveled side edges 37, 38 and 37', 38' are the leading edges of blade 30. Conversely, when the blade assembly rotates counterclockwise in FIG. 3, the blunt edges 39 and 39' are the leading edges of this blade.

The second blade 31 (FIG. 6) has a flat horizontal central portion 40 and flat laterally extending arms 41 and 42 on opposite sides of this central portion. As shown in FIGS. 2 and 4, these two blade arms 41 and 42 are inclined downward and outward from the horizontal central portion 40 of this blade.

The blade arm 41 (FIGS. 3 and 6) has one of its sides beveled to provide a surface 43 along substantially the entire length of this arm which extends at an acute angle, preferably about 45°, to both major top and bottom faces of this blade arm. The outer end of this blade arm has a similar beveled surface 44. These beveled surfaces 43 and 44 provide sharp edges 45 and 46 along the top of the side and outer end of this blade arm which are the leading edges when the blade assembly of FIG. 3 rotates clockwise. The opposite side face 47 of this blade arm extends substantially perpendicular to both major faces of this arm, and therefore it provides a comparatively blunt edge at this side of blade arm 41.

The other arm 42 of this blade presents similar side and end surfaces which have the same reference numerals as those for blade arm 41, but with a "prime" subscript added.

With this blade construction, when the blade assembly rotates clockwise in FIG. 3, the sharp beveled side and end edges 43, 45, 44, 46 and 43', 45', 44', 46' are the leading edges of blade 31. Conversely, when the blade assembly rotates counterclockwise in FIG. 3, the blunt side edges 47 and 47' are the leading edges of this blade.

In the operation of this blender, when the reversing switch 29 is in its "forward" position the direction of rotation of the motor is such that the blade assembly in FIG. 3 rotates clockwise. Therefore, the sharp beveled edges of the blades are the leading edges. This is the normal condition for blending relatively soft food materials.

However, if there is any tendency for the material to bridge over the blades and thereby prevent or retard the proper blending action, the user may move the control knob 29a of reversing switch 29 to its "reverse" position to cause the blade assembly to turn counterclockwise in FIG. 3, and then he may repeatedly reverse this control knob back and forth. This repetitive reversal of the direction of rotation of the blade assembly has been found to be very effective in eliminating any tendency for the material to bridge over the rotating blade assembly, and thereby to promote the proper blending of such material.

Where the material to be acted upon is relatively hard, such as ice cubes or whole grain wheat or soy beans, the reversing switch 29 is set to its "reverse" position to cause the motor to rotate the blade assembly counterclockwise in FIG. 3. Consequently, the blunt side edges 39, 39', 47 and 47' of the blades are the leading edges, and these blunt edges have been found to be very effective in chopping up such hard materials without, however, damaging the blade edges, as would be the case if the sharp edges were the leading edges under these conditions.

From the foregoing description it will be apparent that the specific illustrated embodiment of this invention enhances the practical utility of blenders, enabling an improved blending action on soft materials and also enabling the blender to be used successfully on hard materials considered previously to be unsuitable to be chopped up in a blender.

However, while a specific presently-preferred embodiment has been described in detail and illustrated in the accompanying drawing, it is to be understood that various modifications, omissions and refinements which depart from the disclosed embodiment may be adopted without departing from the spirit and scope of this invention.

I claim:

1. Food preparation apparatus for blending soft food materials and chopping (or breaking) relatively harder food materials comprising (I)

(a) a base,
(b) a motor mounted in said base,
(c) a shaft driven by said motor,
(d) means for reversing the direction of drive of said shaft by said motor,
(e) manual control means for said reversing means mounted for access from the exterior of said base, said control means being movable between a position in which said shaft is driven in a forward direction and a position in which said shaft is driven in a reverse direction, and
(f) indicia on said base associated with said control means to indicate when said control means is in a position to cause said shaft to be driven forwardly or reversely, (II)

(a) a container adapted to receive and retain food materials to be prepared therein and having
  (i) side walls and
  (ii) a bottom wall
    said side walls and bottom wall being imperforate except for an opening in said bottom wall, said opening being normally closed by
(b) a blade assembly comprising
  (i) blade means within said container, and
  (ii) a blade shaft carrying said blade but journaled within and extending through said bottom wall opening, and (III)

means for supporting said container on said base and coupling said blade shaft to said motion-driven shaft to rotate said blade shaft in the same direction as said motion-driven shaft, whereby the tendency of soft foods to bridge over and remain out of contact with said blade means during rotation thereof may be reduced by changing said control means between said forward and reverse positions.

2. Apparatus as defined in claim 1 in which said blade means includes radially extending arms, leading edges of said arms, when driven in a forward direction, being differently configured from the leading edge when driven in a reverse direction, whereby such different edge configurations further reduce the bridging tendency when said control means is operated.

3. Apparatus as defined in claim 2, in which the leading arm edges, when said blade means are driven in one direction are sharp beveled edges and, when driven in the opposite direction, are blade edges substantially perpendicular to the radial extent of said arms, whereby hard materials may be chopped without dulling said sharp leading edges by setting said control at the indicated position to drive said blade means so that said blunt edges are presented as the leading edges of said blade arms.

References Cited
UNITED STATES PATENTS

| | | | |
|---|---|---|---|
| 2,669,395 | 2/1954 | Swisher | 241—63 |
| 2,733,396 | 1/1956 | Luther. | |
| 2,740,029 | 3/1956 | Kueser et al. | |
| 2,757,065 | 7/1956 | Caster | 68—31 |
| 2,771,111 | 11/1956 | Seyfried. | |

ROBERT W. JENKINS, *Primary Examiner.*